United States Patent
Brossard et al.

(10) Patent No.: US 10,807,275 B2
(45) Date of Patent: Oct. 20, 2020

(54) TOOLAGE FOR MANUFACTURING A TUBULAR PREFORM OF FIBERS COMPRISING AN ENHANCED COMPACTING DEVICE

(71) Applicant: Airbus Operations SAS, Toulouse (FR)

(72) Inventors: Denis Brossard, Saint Aignan de Grand Lieu (FR); Sébastien Gohier, Saint Jean de Boiseau (FR); Jean-Claude Barbaud, Saint Aignan de Grand Lieu (FR); Gael Perennesse, Saint Aignan de Grand Lieu (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 16/421,825

(22) Filed: May 24, 2019

(65) Prior Publication Data
US 2019/0366587 A1 Dec. 5, 2019

(30) Foreign Application Priority Data
May 30, 2018 (FR) ...................................... 18 54657

(51) Int. Cl.
*B29B 9/14* (2006.01)
*B29B 9/10* (2006.01)

(52) U.S. Cl.
CPC . *B29B 9/14* (2013.01); *B29B 9/10* (2013.01)

(58) Field of Classification Search
CPC ............ B29B 9/10; B29B 9/14; B29C 70/446
See application file for complete search history.

(56) References Cited

U.S. PATENT DOCUMENTS

| | | | |
|---|---|---|---|
| 2,999,780 A | 9/1961 | Perrault | |
| 3,184,357 A * | 5/1965 | Kaspar | B29C 70/446 156/165 |
| 3,377,657 A | 4/1968 | Richardson et al. | |
| 8,535,042 B1 | 9/2013 | Kirkpatrick et al. | |
| 2006/0134251 A1* | 6/2006 | Blanton | B29C 70/446 425/110 |
| 2018/0079156 A1 | 3/2018 | Klimovski et al. | |

FOREIGN PATENT DOCUMENTS

EP 2397312 A1 12/2011
EP 3296091 A1 3/2018

OTHER PUBLICATIONS

French Search Report; priority document, dated Feb. 21, 2019.

* cited by examiner

*Primary Examiner* — Robert B Davis
(74) *Attorney, Agent, or Firm* — Greer, Burns & Crain, Ltd.

(57) ABSTRACT

A toolage for manufacturing a tubular preform of fibers comprising a mold which has a deposition surface on which are superposed laps of fibers and a compacting device configured to cap the mold. The compacting device comprises first and second rings, at least one seal-tight flexible conduit linked to the first and second rings and at least one rigid link element linking the first and second rings. Such a compacting device makes it possible to greatly reduce the time for it to be installed, which makes it possible to reduce the duration of the compacting cycles.

10 Claims, 2 Drawing Sheets

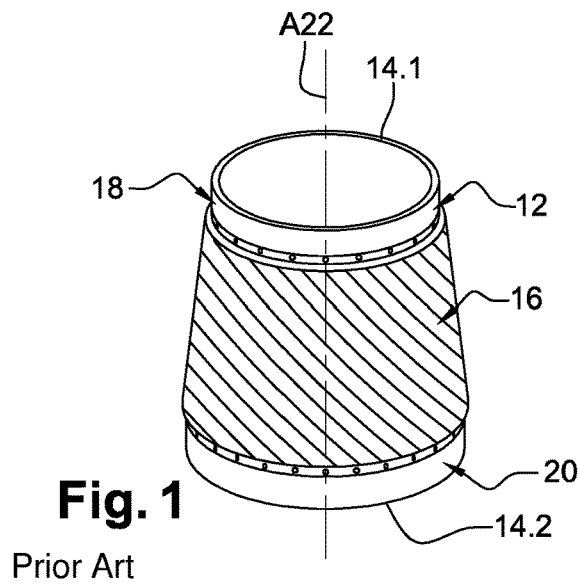
Fig. 1
Prior Art
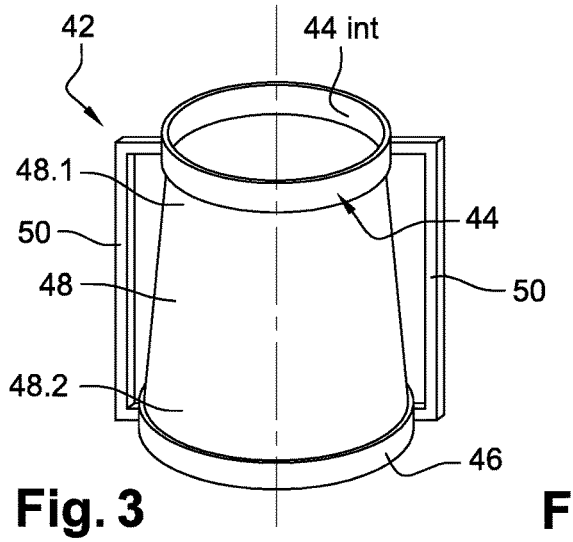
Fig. 3
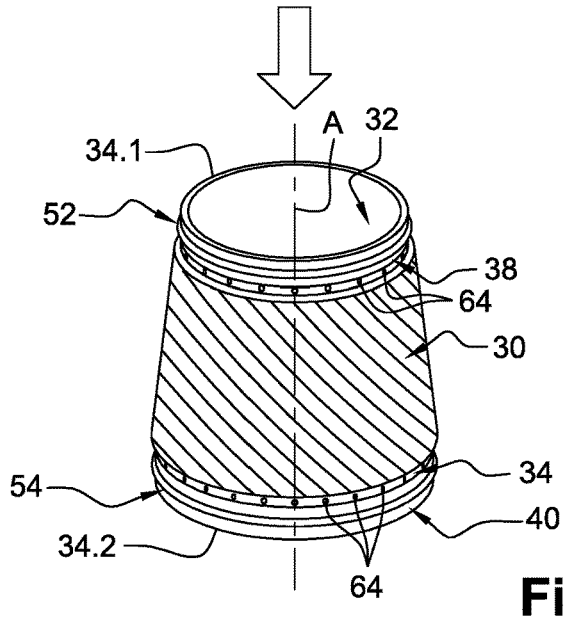
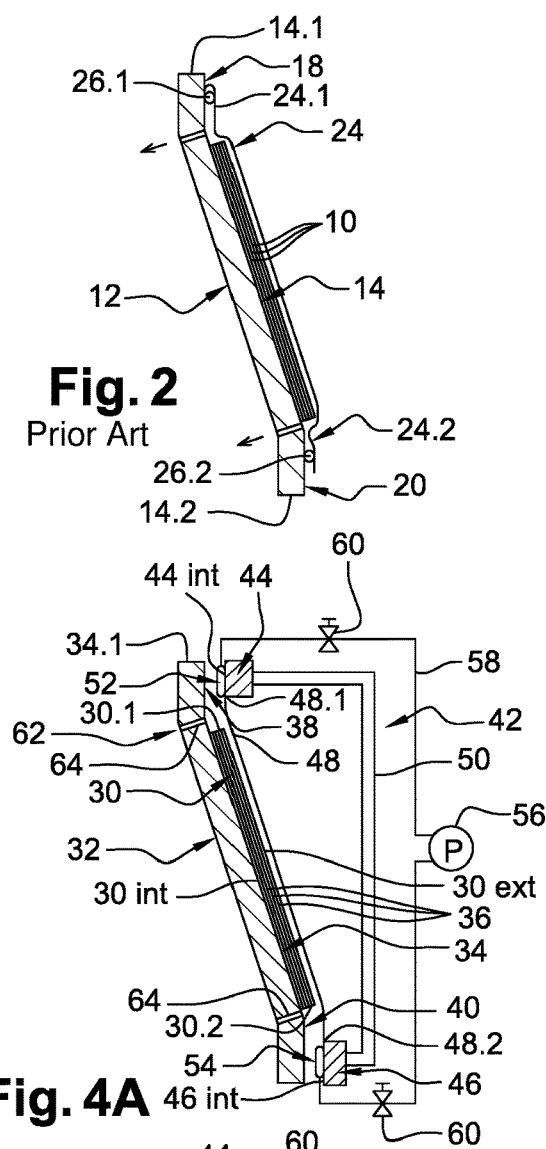
Fig. 2
Prior Art
Fig. 4A
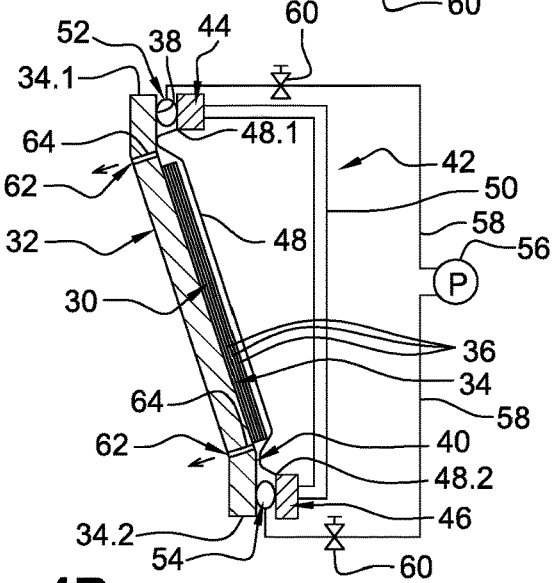
Fig. 4B

TOOLAGE FOR MANUFACTURING A TUBULAR PREFORM OF FIBERS COMPRISING AN ENHANCED COMPACTING DEVICE

CROSS-REFERENCES TO RELATED APPLICATIONS

This application claims the benefit of the French patent application No. 1854657 filed on May 30, 2018, the entire disclosures of which are incorporated herein by way of reference.

FIELD OF THE INVENTION

The present application relates to toolage for manufacturing a tubular preform of fibers comprising an enhanced compacting device, this toolage being more particularly suitable for the manufacturing of a preform of an air inlet of an aircraft nacelle.

BACKGROUND OF THE INVENTION

For the present application, a tubular surface is a surface which extends between two closed outlines that are spaced apart. As an example, a cylinder, of revolution or not, a frustum are tubular surfaces. A tubular preform of fibers is a volume of fibers delimited by an inner tubular surface, an outer tubular surface spaced apart from the first surface by a substantially constant distance, the inner and outer tubular surfaces being linked at their outlines by first and second edges.

According to an embodiment illustrated in FIGS. 1 and 2, a tubular panel, such as an air inlet of an aircraft nacelle, is obtained by stacking laps 10 of prepreg fibers on a mold 12 which has a tubular deposition surface 14 so as to obtain a tubular preform 16 of prepreg fibers, then by consolidating the preform 16.

According to one arrangement, the deposition surface 14 is delimited by a top edge 14.1, arranged in a first approximately horizontal plane, and by a bottom edge 14.2 arranged in a second approximately horizontal plane. The deposition surface 14 extends on either side of the preform 16 and comprises a top contact zone 18, positioned above the preform 16, and a bottom contact zone 20 positioned below the preform 16.

According to this arrangement, the laps are stacked one on top of the other, about a substantially vertical stacking axis A22.

To reduce the risks of porosity of the tubular panel, the laps are compacted several times in the production of the preform 16. Thus, after the deposition of three to five laps, a compacting operation is applied.

According to an embodiment that can be seen in FIG. 2, each compacting operation consists in:
covering the superposed laps with a bladder 24 which extends beyond the superposed laps and which has a top portion 24.1, facing the top contact zone 18, and a bottom portion 24.2 facing the bottom contact zone 20,
positioning a first peripheral seal 26.1, between the top portion 24.1 and the top contact zone 18, and a second peripheral seal 26.2 between the bottom portion 24.2 and the bottom contact zone 20,
extracting the gases present in the volume delimited by the bladder 24, the deposition surface 14 and the first and second peripheral seals 26.1, 26.2 so that the superposed laps are compressed between the bladder 24 and the deposition surface 14.

According to this embodiment, the bladder 24 is totally flexible and disposable. The first and second peripheral seals 26.1, 26.2 are also disposable and independent of the bladder 24 and of the mold 12.

Given the orientation of the laps of fibers which are substantially vertical, fitting the bladder 24 and the first and second peripheral seals 26.1, 26.2 is time-consuming and not easy. Since several compacting operations are necessary to produce a preform, the overall duration of the compacting operations greatly impacts the preform production time.

The present invention aims to remedy all or some of the drawbacks of the prior art.

SUMMARY OF THE INVENTION

To this end, a subject of the invention is a toolage for manufacturing a tubular preform of fibers, comprising:
a mold having a tubular deposition surface on which are superposed laps of fibers, the deposition surface comprising first and second contact zones on either side of the laps of fibers, and
a compacting device.

According to the invention, the compacting device comprises:
a first ring configured to encircle the mold in line with the first contact zone and having a first inner face spaced apart from the first contact zone,
a second ring configured to encircle the mold in line with the second contact zone and having a second inner face spaced apart from the second contact zone,
at least one seal-tight, elastic, flexible conduit, configured to encircle the mold and having a first end, linked to the first ring, and a second end linked to the second ring,
at least one rigid link element linking the first and second rings;
and the toolage comprises at least one first peripheral seal configured to ensure a seal between the first ring and the first contact zone and at least one second peripheral seal configured to ensure a seal between the second ring and the second contact zone.

The compacting device of the toolage makes it possible to greatly reduce the fitting time which makes it possible to reduce the duration of the compacting cycles and ultimately the preform production time.

According to another feature, the first end of the flexible conduit is linked to the first ring so that, in operation, the flexible conduit covers the first peripheral seal and is interposed between the first peripheral seal and the mold; the second end of the flexible conduit is linked to the second ring so that, in operation, the flexible conduit covers the second peripheral seal and is interposed between the second peripheral seal and the mold.

According to a configuration, the flexible conduit is made of a material having a low adhesion with the laps of fibers.

According to another feature, each of the first and second peripheral seals is configured to occupy an inactive first state, in which the peripheral seal is flattened or retracted and does not ensure the seal between the first or second ring and the first or second contact zone, and an active second state in which the peripheral seal is inflated or expanded and ensures the seal between the first or second ring and the first or second contact zone.

According to a configuration, each of the first and second peripheral seals is an inflatable roll and the toolage comprises at least one gas supply, pipelines linking the gas supply to the first and second peripheral seals, and at least one regulation mechanism for triggering the switch from the active state to the inactive state or vice versa.

According to an embodiment, the first and second peripheral seals are respectively linked to the first and second inner faces of the first and second rings.

According to another feature, the compacting device is configured to occupy a rest position, in which it is separated from the mold and a covering position in which it caps the mold, the first and second rings being respectively positioned in line with the first and second contact zones.

According to one arrangement, the compacting device is positioned above and in line with the mold in the rest position.

According to a configuration, the toolage comprises a handling system for moving the compacting device between the rest position and the covering position.

According to an embodiment, the handling system is a lifting system.

BRIEF DESCRIPTION OF THE DRAWINGS

Other features and advantages will emerge from the following description of the invention, a description given purely by way of example, in light of the attached drawings in which:

FIG. 1 is a schematic representation of a mold on which is produced a preform of prepreg fibers, FIG. 2 is a partial cross section of a mold on which are superposed laps of fibers covered by a bladder which illustrates an embodiment of the prior art, FIG. 3 is a schematic representation of a toolage for manufacturing a preform of fibers which illustrates an embodiment of the invention, FIGS. 4A and 4B are partial cross sections of a toolage for manufacturing a preform of fibers which illustrate an embodiment of the invention, before a compacting and during a compacting of laps of fibers.

DETAILED DESCRIPTION OF THE PREFERRED EMBODIMENTS

Figure 5:
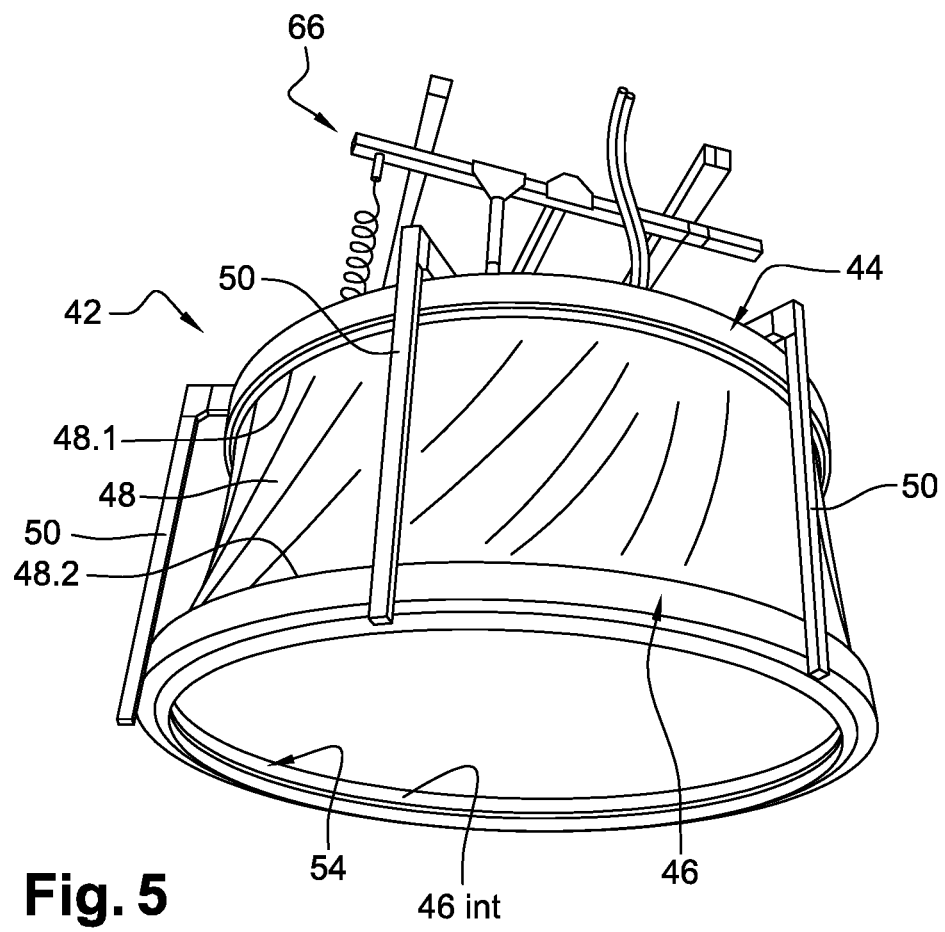
FIG. 5 is a perspective view of a compacting device which illustrates an embodiment of the invention.

In FIGS. 3, 4A, 4B and 6, a toolage for manufacturing a preform 30 of prepreg fibers is represented. This preform 30 is tubular and has an inner tubular surface 30*int*, an outer tubular surface 30*ext* and first and second edges 30.1 and 30.2 linking the inner and outer tubular surfaces 30*int* and 30*ext*.

According to a nonlimiting application, this preform 30 corresponds to a panel of an air inlet after consolidation.

The toolage comprises a tubular mold 32 which has a deposition surface 34 on which are deposited laps 36 of fibers pre-impregnated with resin. The toolage could be used with laps 36 of dry fibers (non-prepreg). The deposition surface 34 is tubular and shaped according to the preform 30 to be obtained and, more particularly, its inner tubular surface 30*int*.

The deposition surface 34 extends between first and second edges 34.1 and 34.2. According to one configuration, the deposition surface 34 is positioned around a substantially vertical axis A and the first and second edges 34.1 and 34.2 are arranged in approximately horizontal planes, the first edge 34.1 being positioned above the second edge 34.2. The deposition surface 34 extends on either side of the preform 30 and comprises a first contact zone 38 between the preform 30 and the first edge 34.1, and a second contact zone 40 between the preform 30 and the second edge 34.2.

The toolage also comprises a compacting device 42 which comprises:
  a first ring 44 configured to encircle the mold 32 in line with the first contact zone 38 and having a first inner face 44*int* spaced apart from the first contact zone 38,
  a second ring 46 configured to encircle the mold 32 in line with the second contact zone 40 and having a second inner face 46*int* spaced apart from the second contact zone 40, and
  at least one sealed flexible conduit 48, configured to encircle the mold 32 and having a first end 48.1, linked to the first ring 44, and a second end 48.2 linked to a second ring 46.

The compacting device 42 comprises at least one rigid link element 50 linking the first and second rings 44, 46 in order to retain a constant positioning between the first and second rings 44 and 46. This solution makes it possible to simultaneously position the first and second rings 44, 46 in line with the first and second contact zones 38, 40.

According to one configuration, each rigid element 50 is positioned outside the flexible conduit 48.

According to an embodiment, the compacting device 42 comprises several rigid elements 50, for example six, distributed regularly over the periphery of the first and second rings 44, 46.

As an example, each rigid element 50 is metallic or made of composite material.

According to a configuration that can be seen in FIG. 5, the first ring 44 having a smaller area than that of the second ring 46, each rigid element 50 takes the form of an L shaped leg, a first branch of the L being substantially horizontal and linked to the first ring 44, a second branch of the L being approximately vertical or slightly inclined and linked to the second ring 46. Obviously, the invention is not limited to this configuration and other configurations can be envisaged.

The flexible conduit 48 is made of a material that has a low adhesion with the laps 36 of prepreg fibers. The flexible conduit 48 is made of an elastic material so as to closely follow the form of the superposed laps 36 and of the deposition surface 34 regardless of the number of superposed laps 36.

According to an embodiment, the flexible conduit 48 is made of elastomer, such as, for example, an elastomer marketed under the brand name "Mosite."

The toolage also comprises:
  at least one first peripheral seal 52 configured to ensure a seal between the first ring 44 and the first contact zone 38,
  at least one second peripheral seal 54 configured to ensure a seal between the second ring 46 and the second contact zone 40.

Figure 6:
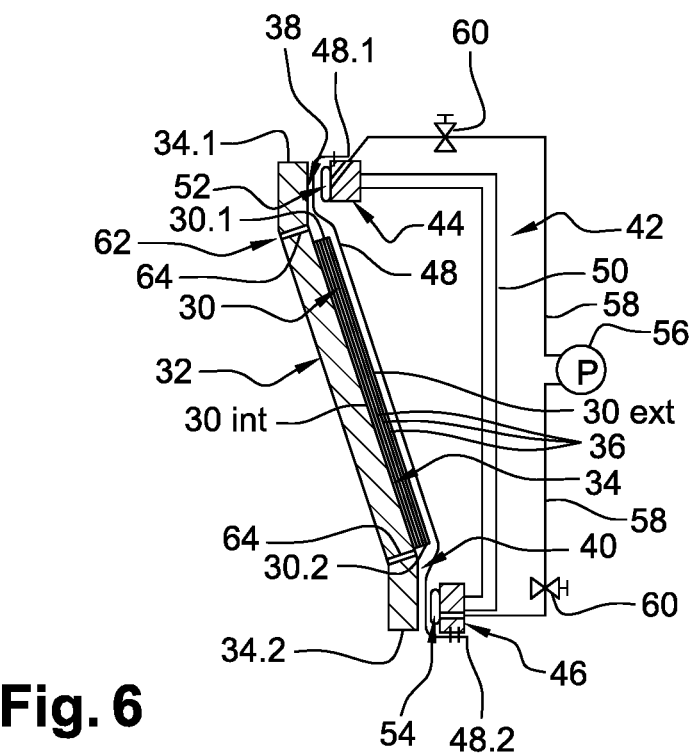
FIG. 6 is a partial cross section of a toolage for manufacturing a preform of fibers which illustrates another embodiment.

According to a first variant illustrated by FIGS. 4A, 4B and 6, the first and second peripheral seals 52, 54 are respectively linked to the first and second inner faces 44*int*, 46*int* of the first and second rings 44, 46.

According to a second variant illustrated by FIG. 3, the first and second peripheral seals 52, 54 are respectively linked to the first and second contact zones 38, 40.

Whatever the variant, the first and second peripheral seals 52, 54 are respectively linked to the first and second inner faces 44*int*, 46*int* of the first and second rings 44, 46 and/or to the first and second contact zones 38, 40.

According to a first configuration that can be seen in FIGS. 4A and 4B, the first end 48.1 of the flexible conduit 48 is linked, in a seal-tight manner, to the first ring 44 and the second end 48.2 of the flexible conduit 48 is linked, in a seal-tight manner, to the second ring 46. According to this first configuration, the flexible conduit 48 does not cover the first and second peripheral seals 52, 54 and is not interposed between the peripheral seals and the mold 32.

According to a second configuration that can be seen in FIG. 6, the first end 48.1 of the flexible conduit 48 is linked to the first ring 44 so that, in operation, the flexible conduit 48 covers the first peripheral seal 52 and is interposed between the first peripheral seal 52 and the mold 32, more particularly, the first contact zone 38 of the mold 32. In parallel, the second end 48.2 of the flexible conduit 48 is linked to the second ring 46 so that, in operation, the flexible conduit 48 covers the second peripheral seal 54 and is interposed between the second peripheral seal 54 and the mold 32, more particularly, the second contact zone 40 of the mold 32.

According to this second configuration, in operation, the first and second peripheral seals 52, 54 press the flexible conduit 48 against the first and second contact zones 38, 40 to ensure the seal.

According to a first advantage, the joins between the first and second ends 48.1, 48.2 of the flexible conduit 48 and the first and second rings 44, 46 do not need to be seal-tight, which tends to simplify the fixing of the flexible conduit 48 on the first and second rings 44, 46. According to another advantage, this makes it possible to extend the life of the flexible conduit 48, the joins between the first and second ends 48.1, 48.2 of the flexible conduit 48 and the first and second rings 44, 46 being almost not at all strained during depressurization because they are positioned outside of the first and second peripheral seals 52, 54. Finally, according to another advantage, the first and second peripheral seals 52, 54 are protected by the flexible conduit 48 and are not linked thereto.

The first and second rings 44 and 46 are made of an almost non-extendible material so as to allow the compression of the first and second peripheral seals 52, 54. As an example, each of the first and second rings 44, 46 is metallic or made of composite material.

According to another feature, each of the first and second peripheral seals 52 and 54 is configured to occupy an inactive first state, in which the peripheral seal 52, 54 is flattened or retracted and ensures a seal between the first (or second) ring 44 (or 46) and the first (or second) contact zone 38 (or 40) and an active second state in which the peripheral seal 52, 54 is inflated or expanded and ensures a seal between the first (or second) ring 44 (or 46) and the first (or second) contact zone 38 (or 40) by being compressed between the first (or second) ring 44 (or 46) and the first (or second) contact zone 38 (or 40).

According to an embodiment, each of the first and second peripheral seals 52, 54 is an inflatable roll and the toolage comprises at least one gas supply 56, in particular, a compressed air supply, pipelines 58 linking the gas supply 56 to the first and second peripheral seals 52, 54, at least one regulation mechanism 60 for triggering the switch from the inactive state to the active state or vice versa and safety systems such as relief valves for example.

Other solutions can be envisaged for the peripheral seals 52, 54. Thus, they could be produced in a material configured to retract or expand, as a function of temperature, for example.

The toolage comprises a gas extraction system 62 configured to extract the gases from a volume, isolated by the deposition surface 34 and the compacting device 42, and ensure a compression of the laps 36 of prepreg fibers. According to an embodiment, the gas extraction system 62 comprises at least one conduit 64 emerging at the deposition surface 34 and linked to at least one vacuum pump. The gas extraction system 62 is not described further because it can be identical to that of the prior art.

The compacting device 42 is configured to occupy a rest position in which it is separated from the mold 32, the second ring 46 being positioned above the first edge 34.1 of the deposition surface 34, and a covering position in which it caps the mold 32, the first and second rings 44, 46 being respectively positioned in line with the first and second contact zones 38, 40.

In the rest position, the compacting device 42 is positioned in line with and above the mold 32.

As illustrated by FIG. 5, the toolage comprises a handling system 66 for moving the compacting device 42 between the rest position and the covering position. According to an embodiment that can be seen in FIG. 5, the handling system 66 is a lifting system, such as a hoist or a bridge crane for example, fixed to a fixed structure positioned above the mold 32.

According to another feature, the toolage comprises a guiding system to assist the positioning of the compacting device relative to the mold 32 at least in the approach to the covering position.

The principle of operation of the toolage is as follows:

With the compacting device being in the rest position, as illustrated in FIG. 3, laps 36 of prepreg fibers are superposed on the deposition surface 34. From a determined number of superposed laps 36, the latter must be compacted.

For each compacting operation, the first and second peripheral seals 52, 54 being in the inactive state, the compacting device 42 is moved to the covering position, as illustrated in FIG. 4A. Next, the first and second peripheral seals 52, 54 are supplied with compressed air to provoke their switch to the active state so as to ensure a seal between the first ring 44 and the first contact zone 38 and between the second ring 46 and the second contact zone 40, as illustrated in FIG. 4B.

The gas extraction system 62 is activated to provoke the compression of the laps 36 between the flexible duct 48 and the deposition surface 34, as illustrated in FIG. 4B.

When the laps 36 have been compacted for a predefined time, the gas extraction system 62 is deactivated and the volume delimited by the deposition surface 34 and the compacting device 42 is reset to atmospheric pressure, then the first and second peripheral seals 52, 54 are no longer supplied with compressed gas and revert to the inactive state.

The compacting device 42 is then moved to the rest position and a new lap deposition cycle 36 can be carried out.

The compacting device 42 makes it possible to greatly reduce the time for it to be installed which makes it possible to reduce the duration of the compacting cycles and ultimately the preform production time.

It is simple and practical to use.

Finally, the flexible conduit 58 can be reused, thus making it possible to reduce the waste generated by the use of disposable bladders.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A toolage for manufacturing a tubular preform of fibers, comprising:
    a mold having a tubular deposition surface on which are superposed laps of fibers, the deposition surface comprising first and second contact zones on either side of the laps of fibers,
    a compacting device, comprising:
        a first ring configured to encircle the mold in line with the first contact zone and having a first inner face spaced apart from the first contact zone,
        a second ring configured to encircle the mold in line with the second contact zone and having a second inner face spaced apart from the second contact zone,
        a seal-tight, elastic, flexible conduit, configured to encircle the mold and having a first end, linked to the first ring, and a second end linked to the second ring,
        a rigid link element linking the first and second rings,
    wherein the toolage comprises a first peripheral seal configured to ensure a seal between the first ring and the first contact zone and a second peripheral seal configured to ensure a seal between the second ring and the second contact zone.

2. The toolage for manufacturing a tubular preform of fibers according to claim 1, wherein the first end of the flexible conduit is linked to the first ring so that, in operation, the flexible conduit covers the first peripheral seal and is interposed between the first peripheral seal and the mold, and wherein, in operation, the second end of the flexible conduit is linked to the second ring so that the flexible conduit covers the second peripheral seal and is interposed between the second peripheral seal and the mold.

3. The toolage for manufacturing a tubular preform of fibers according to claim 1, wherein the flexible conduit is made of a material having a low adhesion with the laps of fibers.

4. The toolage for manufacturing a tubular preform of fibers according to claim 1, wherein each of the first and second peripheral seals is configured to occupy an inactive first state, in which the peripheral seal is flattened or retracted and does not ensure the seal between the first or second ring and the first or second contact zone, and an active second state, in which the peripheral seal is inflated or expanded and ensures the seal between the first or second ring and the first or second contact zone.

5. The toolage for manufacturing a tubular preform of fibers according to claim 4, wherein each of the first and second peripheral seals is an inflatable roll and wherein the toolage comprises a gas supply, pipelines linking the gas supply to the first and second peripheral seals, and a regulation mechanism for triggering a switch from the inactive state to the active state or vice versa.

6. The toolage for manufacturing a tubular preform of fibers according to claim 1, wherein the first and second peripheral seals are respectively linked to the first and second inner faces of the first and second rings.

7. The toolage for manufacturing a tubular preform of fibers according to claim 1, wherein the compacting device is configured to occupy a rest position in which the compacting device is separated from the mold and a covering position in which the compacting device caps the mold, the first and second rings being respectively positioned in line with the first and second contact zones.

8. The toolage for manufacturing a tubular preform of fibers according to claim 1, wherein the compacting device is positioned, in a rest position, above and directly in line with the mold.

9. The toolage for manufacturing a tubular preform of fibers according to claim 8, wherein the toolage comprises a handling system for moving the compacting device between the rest position and the covering position.

10. The toolage for manufacturing a tubular preform of fibers according to claim 9, wherein the handling system is a lifting system.

* * * * *